(12) United States Patent
Alisobhani et al.

(10) Patent No.: US 6,430,212 B1
(45) Date of Patent: Aug. 6, 2002

(54) SPREAD-SPECTRUM GMSK/M-ARY RADIO

(75) Inventors: Jalal Alisobhani, Corona Del Mar; Donald K. Leimer, Rancho Palos Verdes; Richard Kai-Tuen Woo, Orange; Mark Philip Kaplan, Culver City, all of CA (US)

(73) Assignee: Navcom Technology, Inc., Redondo Beach, CA (US)

( * ) Notice: Subject to any disclaimer, the term of this patent is extended or adjusted under 35 U.S.C. 154(b) by 0 days.

(21) Appl. No.: 09/522,393

(22) Filed: Mar. 9, 2000

Related U.S. Application Data
(60) Provisional application No. 60/132,882, filed on May 6, 1999.

(51) Int. Cl.[7] .............................................. H04B 1/707
(52) U.S. Cl. ........................ 375/141; 375/142; 375/145; 375/149; 375/150
(58) Field of Search ................................. 375/130, 140, 375/141, 142, 145, 146, 147, 149, 150

(56) References Cited

U.S. PATENT DOCUMENTS

| | | | |
|---|---|---|---|
| 4,114,155 A | * | 9/1978 | Raab ........................ 343/103 |
| 4,538,281 A | * | 8/1985 | Rajan ........................ 375/140 |
| 5,327,455 A | * | 7/1994 | De Gaudenzi et al. ..... 375/140 |
| 5,815,526 A | * | 9/1998 | Rice .......................... 375/206 |
| 5,920,591 A | * | 7/1999 | Fukasawa et al. .......... 375/208 |

\* cited by examiner

Primary Examiner—Don N. Vo
(74) Attorney, Agent, or Firm—Pennie & Edmonds LLP (57) ABSTRACT

A communication device includes a transmitter and receiver. The transmitter includes an M-ary encoder configured to generate an M−1 number of distinctive symbols each comprising k bits. M is equal to $2^k$ and k is a positive integer. The transmitter also includes a code generator configured to produce spread spectrum codeword sequences based on the symbols generated by the M-ary encoder and based on a first and a second Gold code polynomials. The transmitter sends a radio signal based on the spread spectrum codeword sequences. The receiver is configured to receive the radio signal. The receiver includes a first shift register configured to receive an input signal generated based on the received radio signal and a second shift register configured to receive and circularly shift a locally generated codeword sequence that is identical to the codeword sequence used to encode the symbols. The receiver also includes an accumulator coupled to the first and second shift registers and configured to multiply and accumulate stored values in the first and second shift registers each time the second shift register is circularly shifted and a selecting device coupled to the accumulator and configured to identify one symbol from the plurality of symbols based on outputs from the accumulator. A method corresponding to the device is also provided.

47 Claims, 9 Drawing Sheets

Order of Bits Written into Interleaver:

SPREAD-SPECTRUM GMSK/M-ARY RADIO

CROSS-REFERENCE TO RELATED APPLICATIONS

This application claims the benefit of U.S. Provisional Application No. 60/132,882 filed May 6, 1999.

FIELD OF THE INVENTION

This invention relates to spread-spectrum communications systems that utilize Gold-code sequence generator in combination with an M-ary encoding scheme.

BACKGROUND OF THE RELEVANT ART

A conventional mobile communication system comprises communication networks each of which includes a base station and a number of mobile radios that communicate with the base station. In such a communication system, a communication signal from one mobile radio should not interfere with communication signals from other mobile radios within a network, and communication signals from one network should be free of interference from communication signals of other networks. Conventionally, a Time Division Multiple Access (TDMA) scheme is utilized to separate one mobile radio signal from other radio signals within a network. Further, different networks may then separate themselves from each other by using a Frequency Division Multiple Access (FDMA) scheme.

When a communication network uses the TDMA method, it is desirable for receivers in the mobile radios to synchronize to a signal transmitted from the base station quickly since the time expended for synchronization is time that cannot be used for communication. Thus, non-coherent modulation techniques are preferable since they do not require additional time to synchronize, and since they are more tolerant of Rayleigh-fading channels. However, non-coherent modulation schemes are more susceptible to interference than coherent modulation schemes. M-ary signaling is one non-coherent modulation scheme that minimizes the susceptibility to interference. For example, 64-ary orthogonal signaling is used in the IS-95 CDMA cellular system. One weakness with this form of modulation is that the orthogonality among signals is lost when the signals are transmitted through a multipath channel, since the delayed component of the signal is identical to another signal.

With respect to FDMA, as the number of networks increases within a given geophysical area, the degree of separation achieved with the FDMA scheme is reduced. This results in one network interfering with the networks that use adjacent frequency signals. This interference is most detrimental when a radio causing the interference is closer to a base station than a mobile radio that actually belongs to the base station's network. This phenomenon is called the "near-far" interference problem. This problem is somewhat mitigated by confining the frequency spectrum of the communication signals for each network. Gaussian-filtered, Minimum Shift Keyed (GMSK) modulation is one method of containing the spectral characteristics of the communication signals. However, this approach does not entirely solve the near-far interference problem.

Therefore it is desirable to provide a mobile communication system that allows multiple communication networks to operate within the same physical area with little or no interference among the communication signals from different networks and among different mobile radios within one network.

SUMMARY OF THE INVENTION

The present invention allows a wireless communication system to maximize the number of co-existing networks within a frequency band while achieving a large far-near ratio, and while using inexpensive class-C transmitters. This is achieved in part by using spreading codes that retain their near-orthogonality when transmitted through multipath channels.

Morever, the present invention permits a plurality of radios to access the network by time-sharing the transmission channel in such a manner that a receiver can synchronize to each transmission with a minimum of time, which in turn allows simultaneous communication of voice and data information.

The present invention also allows multiple private conversations between mobile radios while a plurality of the mobile radios receive broadcast data.

More specifically, the present invention provides a communication device that includes a transmitter and receiver. The transmitter includes an M-ary encoder configured to generate an M−1 number of distinctive symbols, each comprising k bits. M is equal to $2^k$ and k is a positive integer. The transmitter also includes a code generator configured to produce spread spectrum codeword sequences based on the symbols generated by the M-ary encoder and based on first and second Gold code polynomials. The transmitter is configured to send a radio signal based on the spread spectrum codeword sequences. The receiver is configured to receive the radio signal. The receiver includes a first shift register configured to receive an input signal generated based on the received radio signal and a second shift register configured to receive and circularly shift a locally generated codeword sequence, identical to codeword sequence used to encode symbols. The receiver also includes an accumulator coupled to the first and second shift registers and configured to multiply and accumulate stored values in the first and second shift registers each time the second shift register is circularly shifted and a selecting device coupled to the accumulator and configured to identify one symbol from the plurality of symbols based on outputs from the accumulator. A method corresponding to the above described communication device is also provided.

In another aspect of the present invention, the base station and its mobile radios share the carrier frequency assignment by dividing transmission time into segments called time-slots. The time-slots are organized into frames such that mobile units and the base station can be assigned one or more time-slots within a frame, during which time they may transmit their modulated signal as a message segment. Each time-slot assignment can be used to convey voice or data information.

The intended recipient, or recipients, for each message segment are identified within each message segment by its "destination address." This enables the base station to broadcast messages to a plurality of mobile units while several mobile-base-mobile transmissions occur. Each mobile-base-mobile communication consists of the mobile unit transmitting a message segment to the base station, which then re-transmits the message segment to another mobile unit. When appropriate, the re-transmission from the base station may be addressed to a plurality of mobile units. Message segments may contain either voice or data information.

Time-slots may also be assigned to a plurality of mobile units for infrequent transmissions. In this case, the mobile units share the assignment using a slotted-ALOHA protocol. If two mobile units transmit simultaneously, their signals will not be correctly received and both units retransmit the message segments after a random delay if they are not acknowledged by the base station.

The base station and mobile units demodulate the spread-spectrum message segments by first synchronizing the receiver's time reference to a preamble spreading code. Using the synchronized time reference, the receiver demodulates M-ary symbols by finding the one-of-M spreading sequence which correlates best with the received signal. The M-ary symbols are then decoded into binary data conveying either voice or data information. The present invention includes a simplified method of finding the sequence with highest correlation.

Furthermore, the mobile radios of the present invention can transmit and receive digitized voice data or Internet communication packets. In other words, when a computer is connected, the mobile radio of the present invention can send and receive messages to and from the Internet. This capability is in addition to operating as a regular mobile telephone.

BRIEF DESCRIPTION OF THE DRAWINGS

Preferred features of the present invention are disclosed in the accompanying drawings, wherein similar reference characters denote similar elements throughout the several views, and wherein.

DETAILED DESCRIPTION OF THE PREFERRED EMBODIMENTS

Figure 1:
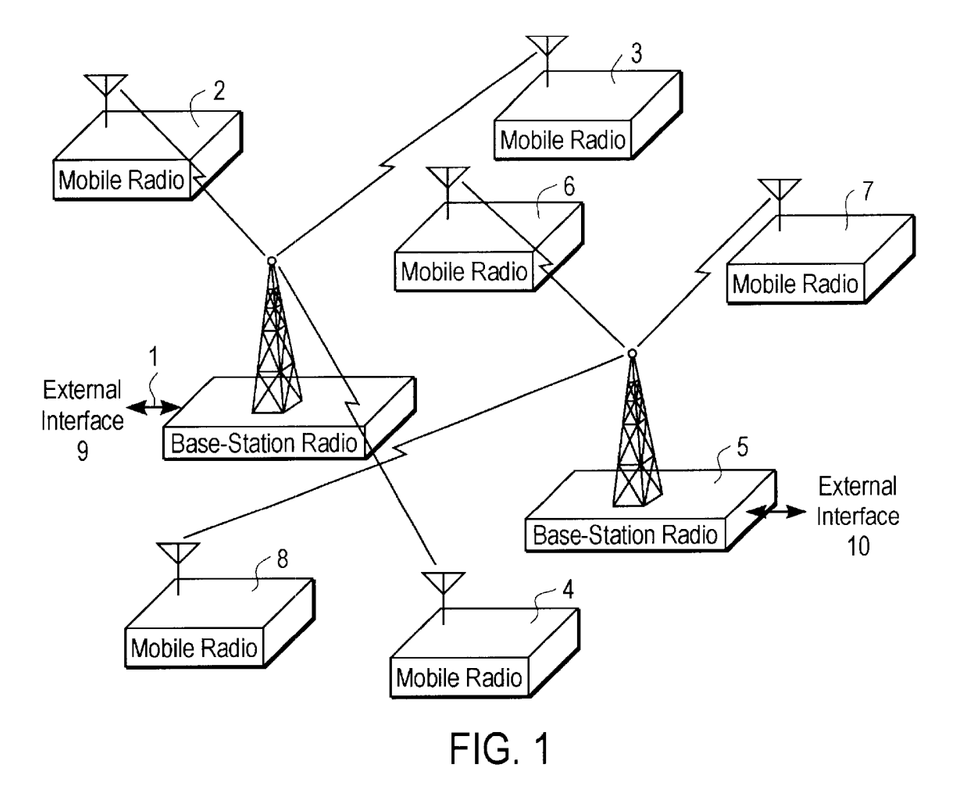
FIG. 1 is an exemplary illustration of two networks operating in the same geophysical area.

An exemplary communication system of the present invention includes a number of communication networks, two of which are illustrated in FIG. 1. A first network includes a base station 1 and mobile radios 2, 3, and 4. A second network comprises a base station 5 and mobile radios 6, 7, and 8. The two networks are preferably interconnected through external interfaces 9 and 10, such as the Public Switched Telephone Network (PSTN) or a direct wired connection. The external interfaces also connect the networks to other data and voice communication systems including the Internet. Within each network, the mobile radios may communicate with the base station, or with other mobile radios belonging to the same network by establishing communication links to the respective base station. For instance, once the communication links are established, a mobile radio communicates with other mobile radios of its network by transmitting to the base station, which then relays the transmission to the receiving mobile radio, or radios. Each mobile radio and base station includes a transmitter and a receiver. The transmitter and receiver in each mobile radio or base station can be also combined into a transceiver.

Figure 2:
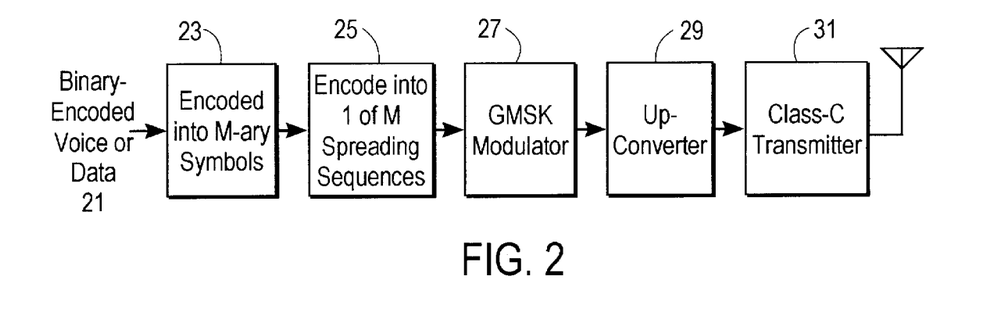
FIG. 2 is a block diagram shows the operations to modulate and transmit a stream of binary-encoded information using the GMSK/M-ary spread-spectrum method.

Referring to FIG. 2, a transmitter of the present invention includes an M-ary encoder 23, a spread spectrum encoder 25, a Gaussian minimum shift keying (GMSK) modulator 27, an up-converter 29 and a class-C transmitter 31.

The M-ary encoder 23 receives binary encoded data or voice bit stream 21 as input. The input data are then encoded into k-bit waveform symbols. In other words, the input data signal is encoded into $M=2^k$ distinctive symbols. In the present invention, k is preferably equal to 6 and M is preferably equal to 64. It follows that output data of the M-ary encoder in the present invention are 6-bit symbols that are input to the spread spectrum encoder 25. In alternative embodiments, the M-ary encoder can also be a 32-ary, 128-ary or any other M-ary encoder available to one of ordinary skill in the art.

The spread spectrum encoder 25 preferably includes a Gold-code sequence generator. A general description of Gold codes is provided in "Optimal Binary Sequences for Spread Spectrum Multiplexing", Robert Gold, *IEEE Trans. Info. Theory*, October 1967, pp 619–621, which is incorporated herein by reference. Gold-code sequences have the property of uniformly low cross-correlation between any two sequences having any time offset. This characteristic of Gold-code sequences can be harnessed to retain near-orthogonal signal sets as they propagate through multipath channels.

For instance, when the length of Gold-code sequence is 6, i.e., M=64, Gold-code's maximum cross-correlation between any two sequences having any time offset is calculated to be 17/63. This is significantly lower than the maximum cross-correlation between two orthogonal sequences that are offset in time, which is ½. The lower cross-correlation (i.e., lower interference among code sequences) minimizes the probability that a time-delayed signal, due to multipath propagation, is incorrectly decoded. Consequently, the use of Gold-code generator 49 to form a set of M codeword sequences can provide more reliable communications through a multipath channel. Furthermore, two different networks sharing the same frequency band can use different sets of Gold-code sequences to minimize the interference between the networks.

Figure 3:
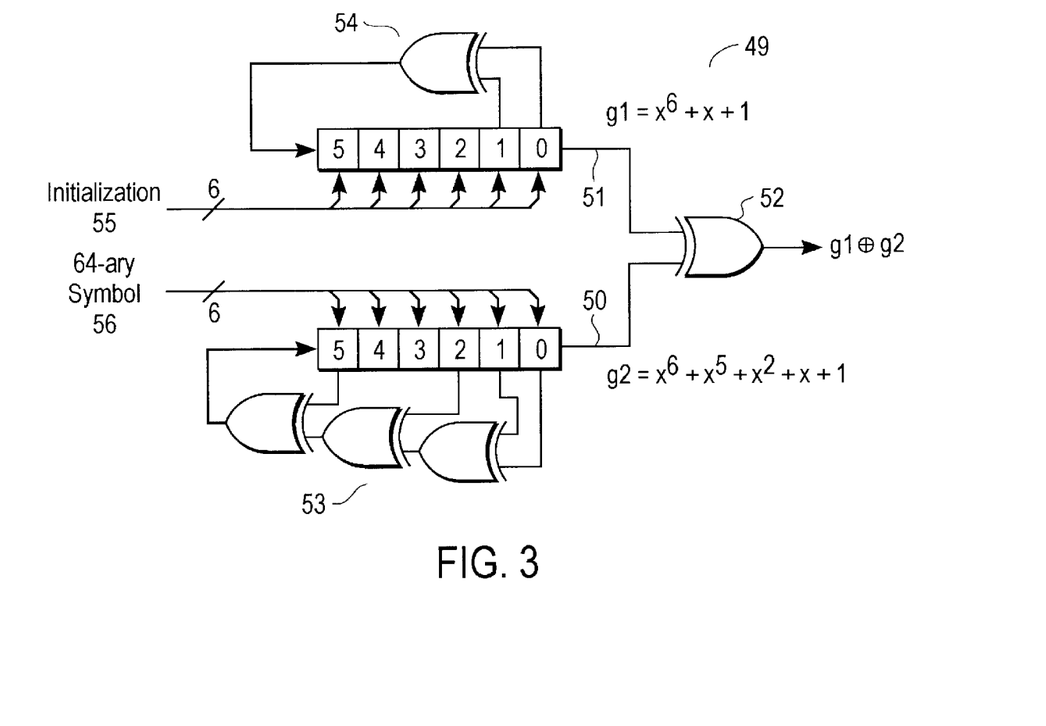
FIG. 3 shows a Gold-code sequence generator.
Figure 3A:
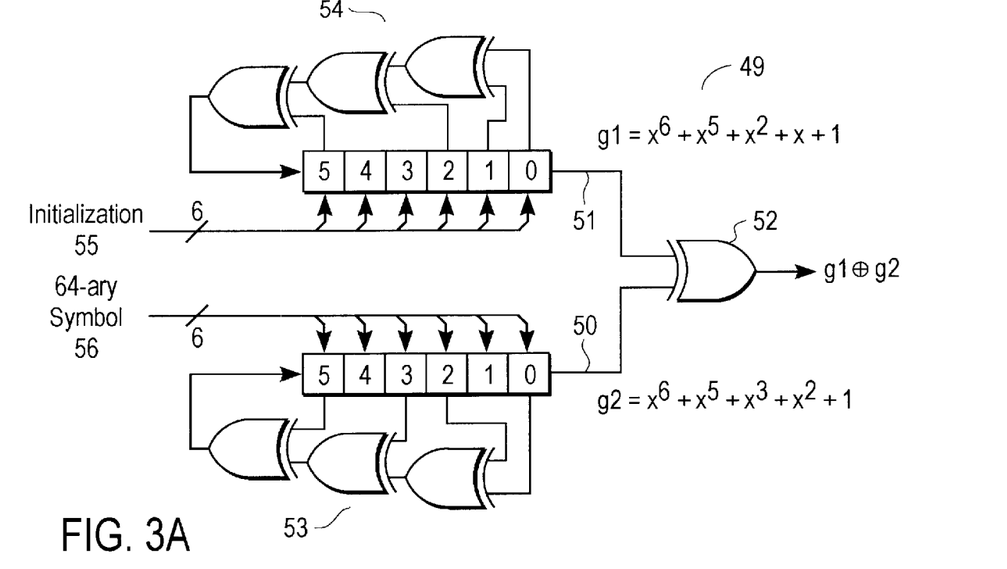
FIGS. 3A, 3B, 3C, 3D and 3E illustrate various embodiments of the Gold-code sequence generator.
Figure 3B:
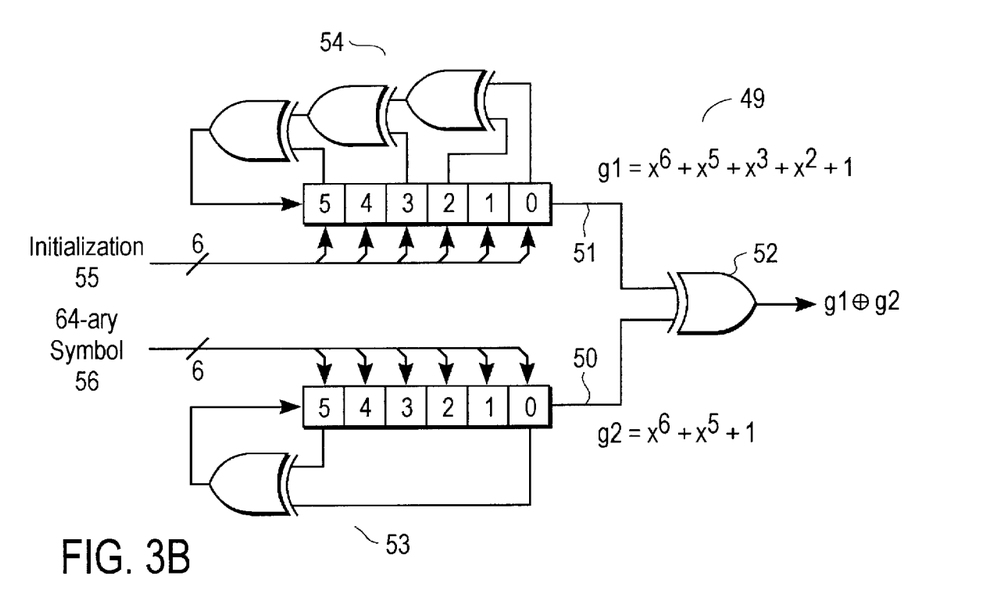
Figure 3C:
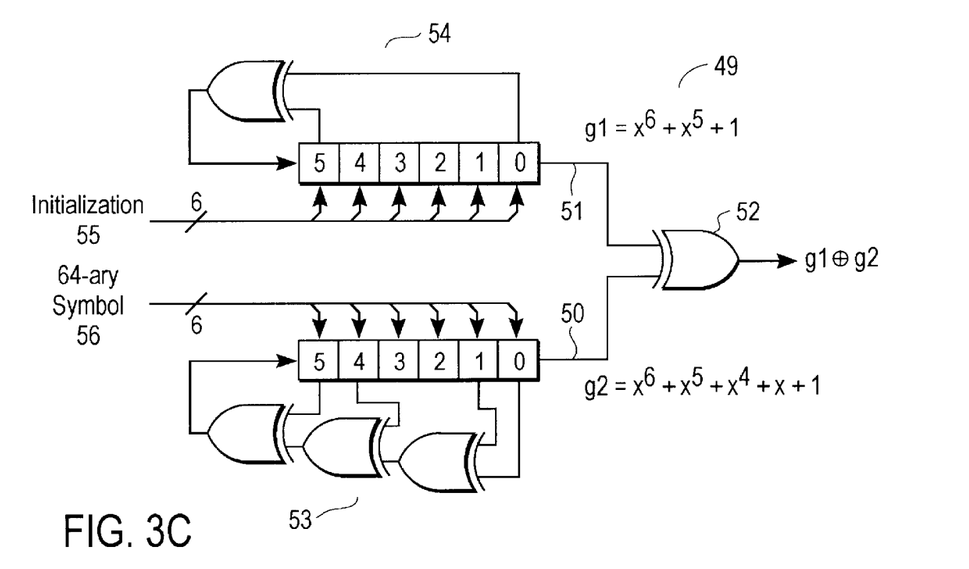
Figure 3D:
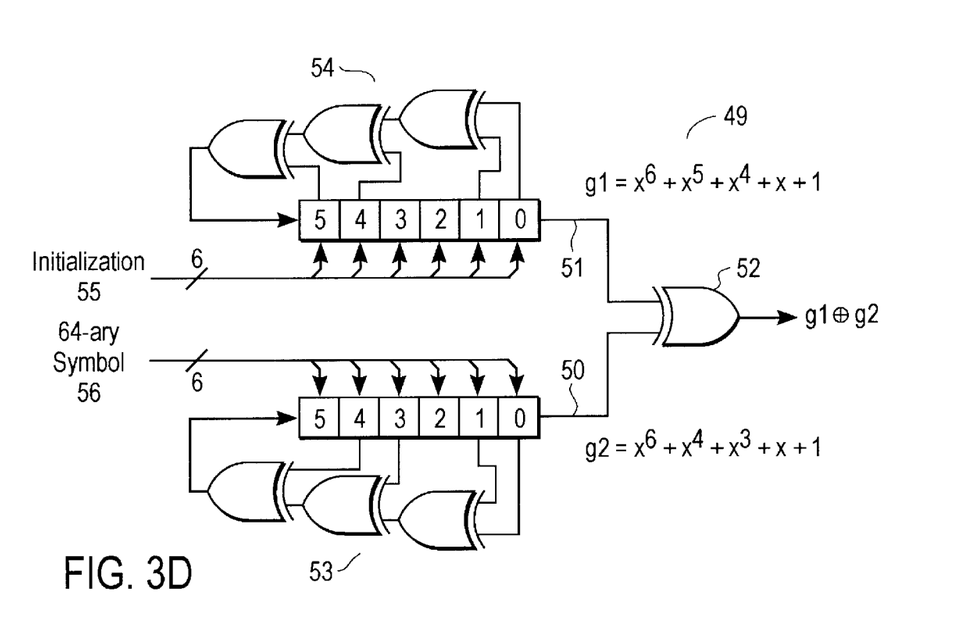
Figure 3E:
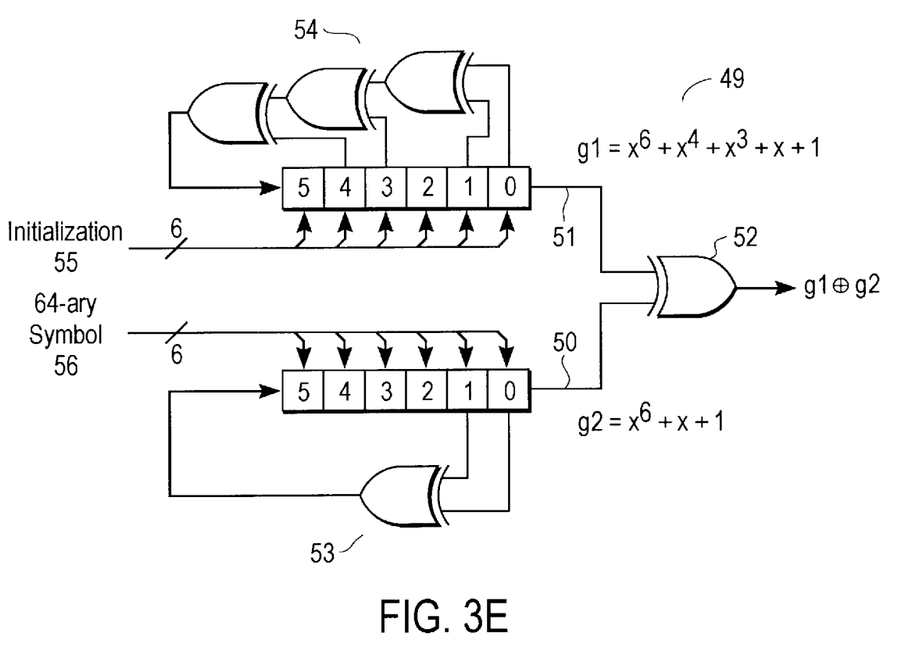

FIG. 3 illustrates an exemplary Gold-code sequence generator 49 for M=64, which includes at least two sets of shift registers 50, 51 and an exclusive-OR gate 52 receiving outputs from the shift registers 50, 51. Each shift register is composed of a number of stages (e.g., 6) and includes a feedback arrangement 53, 54 which comprises one or more exclusive-OR gates for each set of the shift registers 50, 51.

In operation, the M-ary symbols (i.e., 64-ary symbol 56) from the encoder 23 are loaded into the k-stage shift register 50 at the beginning of each symbol interval. The shift registers 50 and 51 are clocked M−1 times to generate maximal-length sequences. As the shift registers are clocked, outputs of certain stages are fed back through the respective feedback arrangements 53, 54. When the all-zeroes symbol (i.e., initialization 55) is loaded into register 50, the output sequence is a set of M−1 zeroes. The two maximal-length sequences generated by the shift registers 50, 51 are input to the exclusive-OR 52 to generate a Gold code sequence as output.

During the synchronization preamble, the shift register 51 is loaded with all-zeroes symbol (i.e., initialization 55) and register 50 is loaded with a non-zero symbol, preferably all-ones. The resulting sequence is thus unique to synchronization to protect against mistaking the preamble for data.

The feedback arrangements, configured to generate the pair of maximal-length sequences, are constructed in accordance with polynomials $g1 = x^6 + x + 1$ and $g2 = x^{6+x5} + x^2 + x + 1$. For M=64, there are six pairs of maximal-length sequences that produce Gold-code sequences when exclusive-OR'd together. Different networks within a common geophysical area may use different sets of Gold-code polynomials to further minimize interference among networks. The polynomial pairs to construct the six different Gold-code sequences to be used by six different networks for M=64 are as follows:

| g1 Polynomial | g2 Polynomial |
| --- | --- |
| $x^6 + x + 1$ | $x^6 + x^5 + x^2 + x + 1$ |
| $x^6 + x^5 + x^2 + x + 1$ | $x^6 + x^5 + x^3 + x^2 + 1$ |
| $x^6 + x^5 + x^3 + x^2 + 1$ | $x^6 + x^5 + 1$ |
| $x^6 + x^5 + 1$ | $x^6 + x^5 + x^4 + x + 1$ |
| $x^6 + x^5 + x^4 + x + 1$ | $x^6 + x^4 + x^3 + x + 1$ |
| $x^6 + x^4 + x^3 + x + 1$ | $x^6 + x + 1$ |

The various embodiments of feedback arrangements 53,54 in accordance with the g1 and g2 polynomials in the above table are illustrated in FIGS. 3, 3A, 3B, 3C, 3D and 3E.

In alterative embodiments, as discussed above in connection with the M-ary encoder, when 32-ary, 128-ary or other M-ary encoders are utilized, the Gold-code sequence generator and its polynomials are changed appropriately in accordance with what is known in the art.

Figure 4:
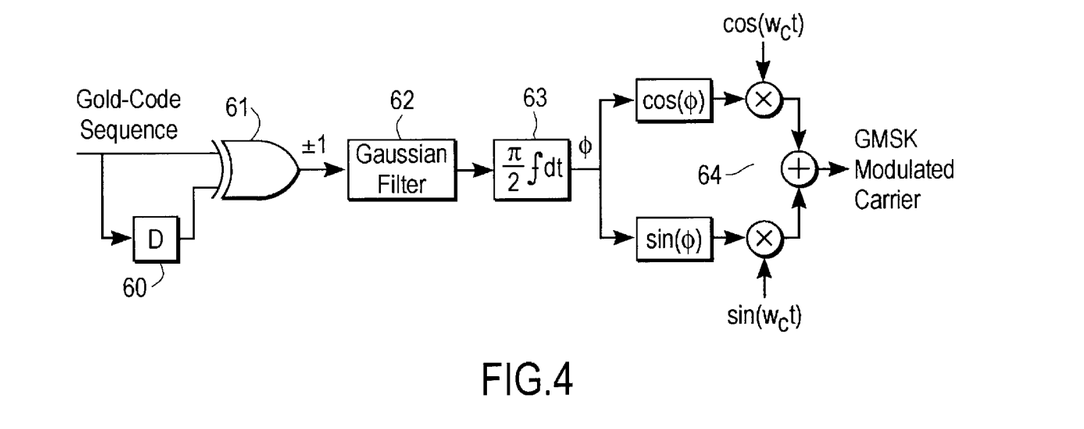
FIG. 4 shows a preferred embodiment of GMSK modulation with 64-ary Gold-code sequences.

Now referring to FIG. 4, the code sequences from the Gold code sequence 49 are pre-coded with a one-chip delay element 60 and an exclusive-OR 61. The output of the exclusive-OR 61 undergoes GMSK modulation. In particular, the output of the exclusive OR 61 is filtered by a low-pass filter 62 having an impulse response of $$h(t) = \frac{1}{2T}\left[\text{erf}\left(\sqrt{2}\pi B\frac{t+T/2}{\sqrt{\ln 2}}\right) - \text{erf}\left(\sqrt{2}\pi B\frac{t-T/2}{\sqrt{\ln 2}}\right)\right] \quad \text{Eqn. (1)}$$

where B is the bandwidth of the lowpass filter 62 having a Gaussian shape and T is the chip interval of the code sequence. The impulse response of the filter 62 is preferably a finite impulse response (FIR) clocked at a multiple of the chip rate. The filter output is integrated by an integrator 63 to yield modulation angles. In turn, a modulator 64 quadrature phase modulates an RF carrier based on the modulation angles.

The following discussion shows that the modulation pre-coding, 60 and 61, preserves the characteristics of code sequence after the GMSK modulation discussed above.

First, consider MSK modulation with a code sequence, $p_k$, having values of ±1. The phase sequence can be written as $$\phi_k = \phi_{k-1} + \frac{\pi}{2} p_k \quad \text{Eqn. (2)}$$

and the modulated signal can be written as $$s(kT) = e^{j\phi_k} = e^{j\phi_{k-1}} e^{j\frac{\pi}{2}p_k} = jp_k e^{j\phi_{k-1}} \quad \text{Eqn. (3)}$$

Moreover, s(kT) can be written as $$s(kT) = e^{j\phi_0} \prod_{i=1}^{k} jp_i \quad \text{Eqn. (4)}$$

for integer values of k>0. For uniformly low cross-correlation, sequence $p_k$ is constructed such that $$g(k) = \prod_{i=1}^{k} p_i \quad \text{Eqn. (5)}$$

is a Gold-code sequence, and the received signal is correlated with the complex conjugate of s(kT), or $$s(kT)^* = e^{-j\phi_0} \prod_{i=1}^{k} (-jp_i) = (-j)^k g(k) e^{-j\phi_0} \quad \text{Eqn. (6)}$$

If g(k) is passed through the modulation pre-coding of 60 and 61, the resulting sequence is $$p_k = g(k) \times g(k-1), \quad \text{Eqn. (7)}$$

with g(0)=1. Substituting this $p_k$ sequence into the above condition results in $$g(k) = g(k) \prod_{i=1}^{k-1} g^2(i) = g(k) \quad \text{Eqn. (8)}$$

for all integer values of k>0.

Now consider GMSK modulation. For GMSK, the pre-coded sequence $p_k$ is filtered with impulse response h(t), and truncated to finite length LT, to produce the modulation phase sequence $$\phi_k = \phi_{k-1} + \frac{\pi}{2} \sum_{n=k-L/2}^{k+L/2} p_n h(kT - nT) \quad \text{Eqn. (9)}$$

$$= \phi_0 + \frac{\pi}{2} \sum_{i=1}^{k} \sum_{n=i-L/2}^{i+L/2} p_n h(iT - nT)$$

$$= \phi_0 + \frac{\pi}{2} \sum_{n=-L/2}^{L/2} \left(h(nT) \sum_{i=1}^{k} p_{i-n}\right).$$

The matched-filter correlation is with $e^{-j\phi_k}$. Filtering the spreading sequence before modulation disperses each chip over a time interval greater than the chip duration of T. Consequently, correlating with a simpler signal such as s(kT) *, as defined for MSK, results in a correlation loss. However, the pre-coding, 61 and 62, preserves the Gold-code cross-correlation characteristics so that the correlation of the received signal with s(kT) * (see, Eqn. 6) is not significantly impaired by time offsets created by the filter 62.

The GMSK modulated carrier signal is then up-converted and transmitted by the transmitter, which is preferably a class-C transmitter 31, over a communication link. The communication link between the base station and its mobile radios is time-division multiple accessed (TDMA). The structure of TDMA, shown in FIG. 5, includes a continuous stream of frames 33. In turn, each frame includes a number of slots 35. More specifically, each 120-millisecond TDMA frame is divided into 72 time slots. In particular, the base station always transmits during three consecutive slots and every other three slots of the frame.

Figure 5:
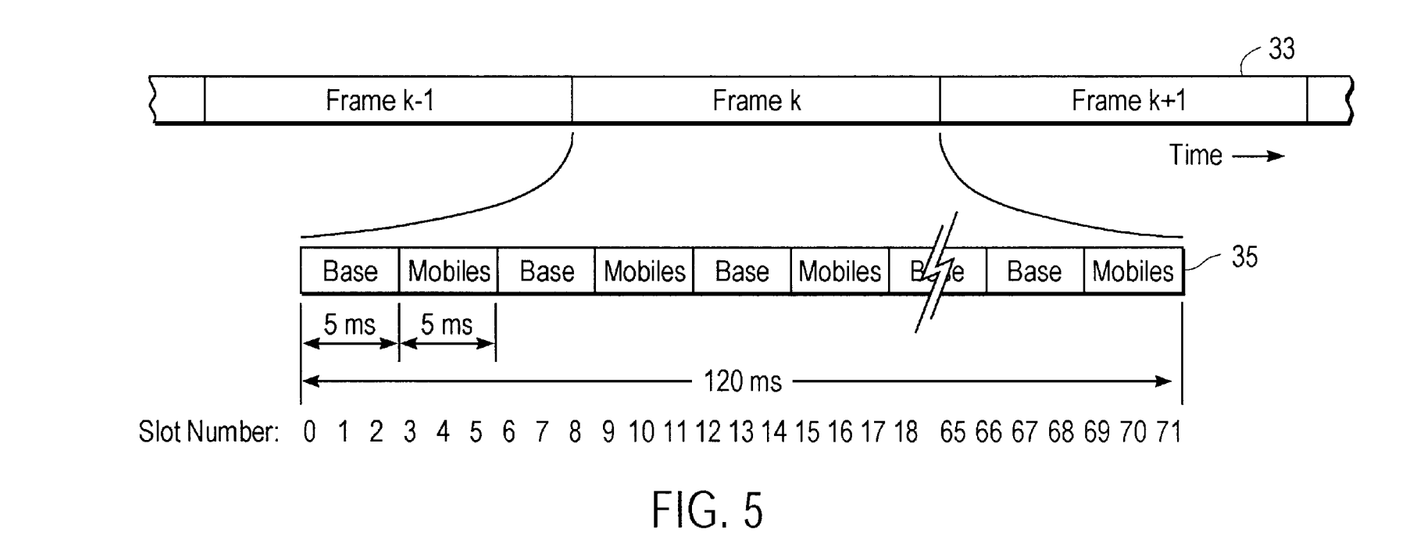
FIG. 5 shows the division of time into frames and time-slot assignments.

More specifically, the base station transmits during slots 0, 1, 2, 6, 7, 8, . . . 66, 67, and 68. The base station assigns the remaining slots as either "reserved slots" or "ALOHA slots" for its mobile radios to transmit radio signals. The reserved slots are assigned for use by a specific mobile radio only. The ALOHA slots are available for any mobile radio to use. The ALOHA transmissions are always one slot long; however, transmissions in reserved slots may be either one, two, or three slots long. Each transmission burst, whether one, two, or three slots long, begins with a synchronization preamble and ends with a guard interval. The synchronization preamble allows the receiver to determine the correct time-alignment of the transmitter's spreading sequence. A unique word follows the synchronization preamble to signify the start of data, which follows the unique-word pattern. The data segment varies in length depending upon the number of slots being used.

Figure 6:
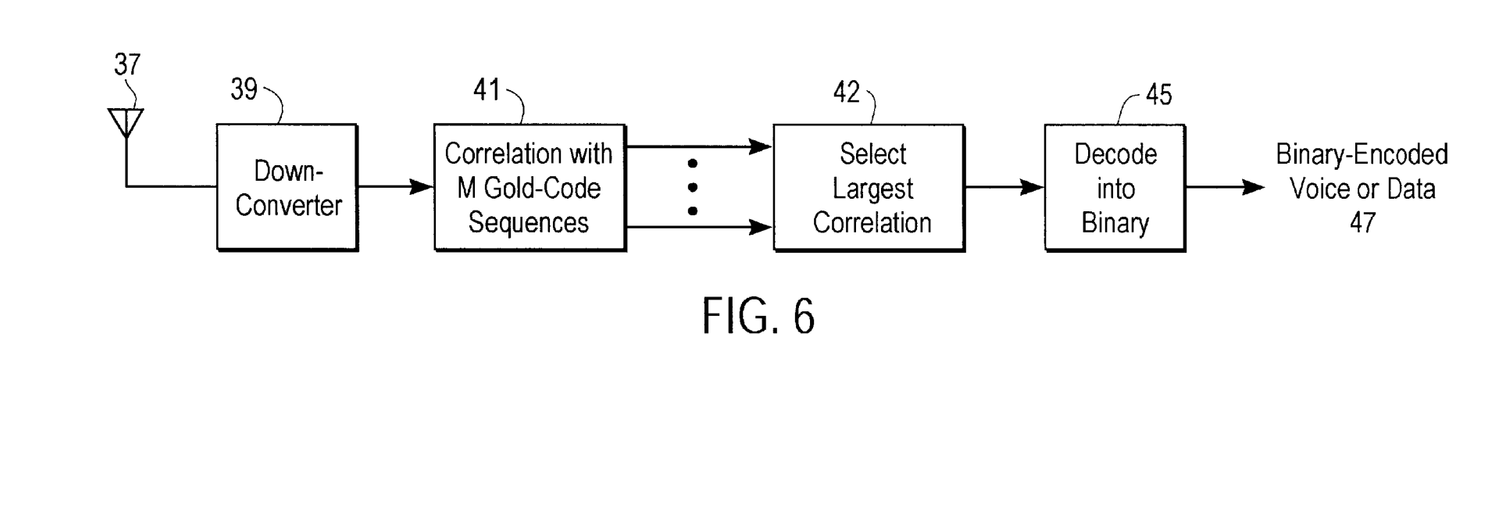
FIG. 6 shows the operations to synchronize and demodulate the received GMSK/M-ary spread-spectrum signal into binary information.

Referring to FIG. 6, a preferred embodiment of a receiver of the present invention includes an antenna 37, a down-converter 39, a Gold code correlator 41, magnitude selection circuitry 43 and an M-ary decoder 45.

The antenna 37 and down-converter 39 are implemented by using standard components and devices known in the art in order to receive the transmitted signal and to translate the received signal to baseband signals, respectively.

The Gold code correlator 41 uses the property that the Gold-code sequence is the product of two maximal-length sequences. In particular, referring to FIG. 7, the Gold-code correlator 41 includes a receiver filter 70, a pair of mixers 71, 72 in series and a circular correlator 73.

Figure 7:
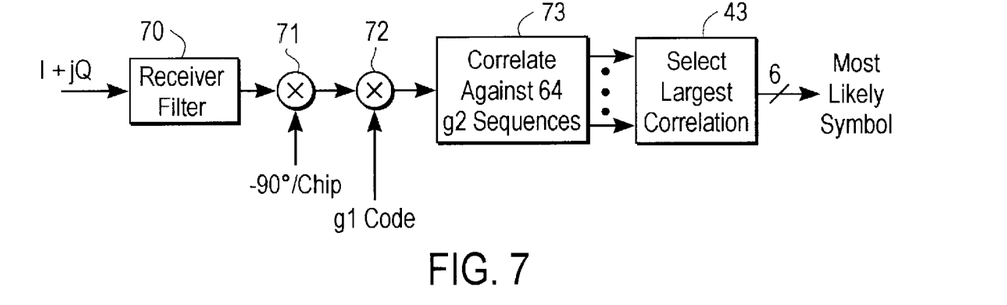
FIG. 7 shows a preferred embodiment of GMSK demodulation of 64-ary Gold-code sequences.

The receiver filter 70 rejects out-of-band noise and interference while passing the GMSK signal. The mixer 71 removes the $(-j)^k$ sequence, or 90°/chip frequency offset produced by the MSK modulation. Further, the mixer 72 removes the g1 sequence, one of the two maximal-length sequences, during demodulation. The circular correlator 73 is therefore simplified to compute the correlation against the M−1 different shifts of a single maximal-length code sequence and the all-zero sequence.

In particular, the correlator 73 preferably determines when the time that each 63-chip sequence starts by using the synchronization preamble, transmitted at the beginning of each transmission burst. The synchronization preamble includes the all-zero g1 sequence and the g2 generator is initialized to a predetermined non-zero value, preferably all-ones. As a result, the largest g2-sequence correlation magnitude indicates the most likely time-of-arrival of the received signal. The correlation magnitudes are averaged with an exponentially-decaying filter over several 63-chip intervals before deciding the most likely time-of-arrival.

When the data segment is transmitted, g1⊕g2 is received. During this mode, the received signal is correlated with the g1 sequence by the mixer 72. Subsequently, the circular correlator 73 correlates the residual signal with M−1 different shifts of the g2 sequence and the all-zero sequence. The magnitudes of the M correlator outputs are compared by the magnitude-selection circuitry 43 to determine the most likely M-ary symbol that was transmitted.

Figure 8:
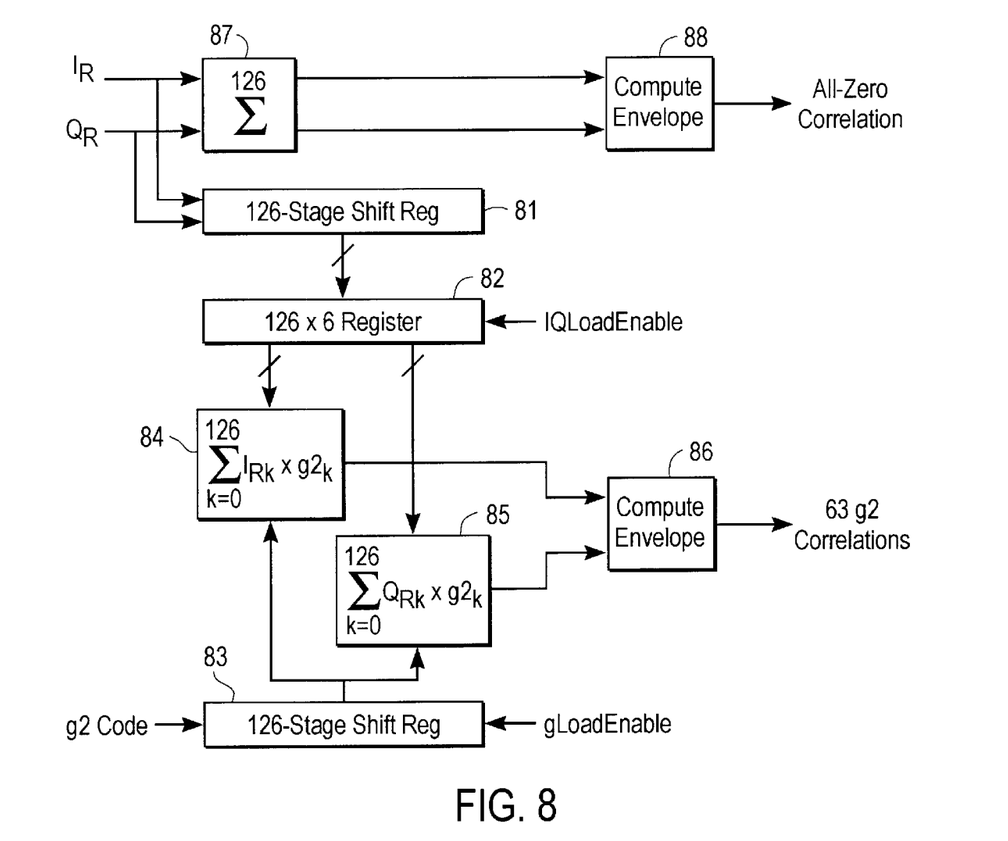
FIG. 8 shows a preferred embodiment of a g1/g2-code correlator.

Now referring to FIG. 8, the circular correlator 73 includes an accumulator 87 and a serial input shift register 81 having 2(M−1) number of stages (e.g., when M=64, there are 126 stages) configured to serially receive an output signal from the mixer 72. The correlator 73 also includes a parallel input shift register 82 having 2(M−1) by k number of stages (e.g., 126 by 6) configured to receive in parallel the 2(M−1) bits of input data from the serial input shift register 81. The correlator 73 further includes a g2-code shift register 83 having 2(M−1) number of stages. Moreover, a pair of accumulators 84, 85 are provided to correlate the 2(M−1) bits of data in the parallel input shift register 82 with the 2(M−1) bits of data in the g2-code shift register 83.

In operation, the output signal from mixer 72, represented by $I_R+jQ_R$, is sampled an integer number of times per chip interval. The signal from the mixer 72 is preferably sampled twice per chip, or 126 times per GMSK symbol interval. As discussed above, the correlator 73 operates in two different modes: synchronization and demodulation. The correlator 73 operated in the synchronization mode to correctly align locally generated g1 and g2 code sequences to the received signal. After the locally generated code sequences are aligned in time to the received signal, the correlator 73 operates in the demodulation mode to find the most likely sequence of M-ary symbols that is being received.

In particular, during the synchronization mode, the incoming $I_R+jQ_R$ signal is shifted into the register 81 at each sampling instant. The register 82 is enabled, via IQLoad-Enable signal, to load the shifted signals at each sampling instant to be correlated against the g2 code that has been loaded into register 83. The accumulators, multiply-and-add circuits, 84 and 85 compute the complex correlation at each sampling instant. Subsequently, envelope computation 86 yields a real-valued correlation at each instant by taking, or approximating, the square root of a squared real term added to a squared imaginary term. This process is performed for at least 63 chip intervals, and the sampling instant for which the real-valued correlation is maximized indicates the end, or time alignment, of the g1 and g2 codes.

During the demodulation mode, the incoming $I_R+jQ_R$ signal is also shifted into register 81 at each sampling instant. However, the register 82 is only loaded at the end of each g2 code sequence. The incoming signal is also accumulated in 87 for the duration of the g2 code interval. At the end of the g2 sequence, the envelope of the accumulation is computed by 88. The envelope value is calculated by taking, or approximating, the square root of a squared real term added to a squared imaginary term. This envelope is the correlation with the all-zero, g2 sequence. After loading register 82 and while the next symbol sequence is being collected by register 81, the g2 code sequence is circularly shifted in register 83. For each shift, a real-valued correlation is computed by 84, 85, and 86. Every other correlation yields sixty-three values. In one embodiment, using the magnitude selection circuitry 43, the largest of these output values, 86, and the output of 88 is identified as the most likely g2 code sequence that was transmitted.

The most likely 64-ary symbol can be represented by 6 bits, corresponding to the modulator input at the transmitter. The likelihood of each of the 6 bits is required to decode the convolutionally-encoded user-data bit stream using a maximum likelihood decoder as described in the article "Convolutional Codes and Their Performance in Communications Systems", A. J. Viterbi, *IEEE Transactions on Communications Technology*, October 1971, pp 751–771, which is incorporated herein by reference. The largest envelope can convey this likelihood information for all six bits, also called soft decisions, as described in the article "Performance of Power-Controlled Wideband Terrestrial Digital Communication", A. J. Viterbi, A. M. Viterbi, and E. Zehavi, *IEEE Transactions on Communications Technology*, April 1993, pp. 559–568, which is incorporated herein by reference. However, it is preferable to convey only the largest envelope corresponding to each of the six bits.

Figure 9:
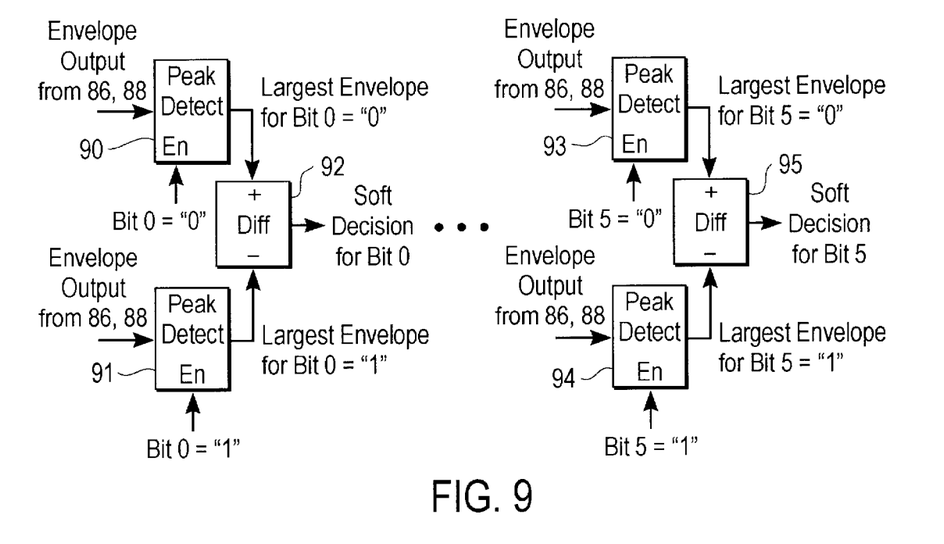
FIG. 9 shows a preferred method of calculating soft decisions.

FIG. 9 shows the preferred embodiment of formulating six soft decisions for the 64-ary demodulator output. Each of the 64 codeword symbol can be uniquely numbered by a six-bit number; i.e. bits "0" through "5". Thirty-two of the codewords are numbered such that bit "0" is zero valued, and the remaining thirty-two codewords have bit "0" equal to "1". For each codeword symbol, envelope computation 86 or 88 sequentially computes the envelope. These envelope values are applied to peak detectors 90 and 91. The peak detector 90 identifies the largest envelope of the thirty-two codewords with bit "0" equal to "0", and the peak detector 91 identifies the largest envelope of the thirty-two codewords with bit "0" equal to "1". After comparing the envelopes of all 64 codewords, a difference calculator 92 calculates the difference of the identified peak envelopes. This difference is used as the soft decision for bit "0", with the magnitude of the difference conveying the relative likelihood of the correct bit decision being "0" instead of "1". Similar processing is performed to calculate soft decisions for bits "1" through "5".

The above described transmitter and receiver characteristics are incorporated into a preferred embodiment of a transceiver of the present invention. Both base stations and mobile radios can include the functional components shown in FIG. 10. The antenna 100 is used to collect electromagnetic radiation for reception and launch electromagnetic radiation for transmission. The transmitter-receiver (T-R) switch 101 directs the signal flow for transmission and reception. The receiver down-converter 102 translates the received radio-frequency signals to baseband in-phase (I) and quadrature-phase (Q) signals. Either a bandpass filter at an intermediate frequency or lowpass filters at baseband restrict the bandwidth of the received signals. The I and Q signal components are demodulated into soft decisions that are deinterleaved and used to decode the digital data messages.

Figure 10:
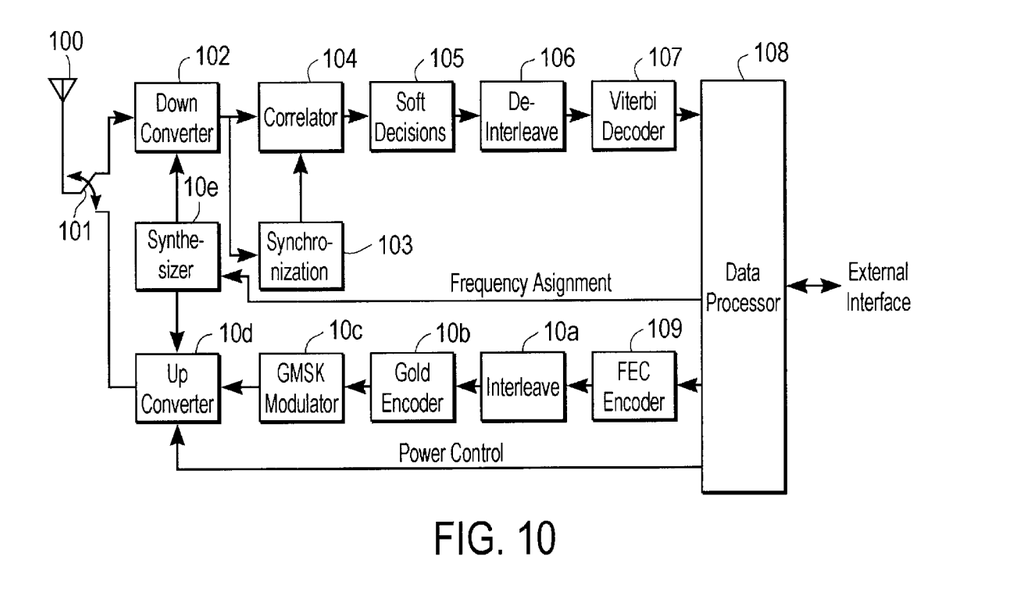
FIG. 10 is a block diagram of the base and mobile radio.

Demodulation is performed by first synchronizing 103 the receiver timing to the incoming signal, and then correlating 104 the incoming signal with the M Gold-code sequences.

The data processor 108 parses the digital messages, and either stores the received data for later transmission, outputs the data to the external interface, or uses the data for internal processing. During transmission, the data processor 108 outputs digital data messages to the radio. The radio encodes and interleaves the data for error correction prior to Gold-code encoding 10b and GMSK modulation 10c. The GMSK signal is then up-converted 10d to the RF carrier for amplification. The transmitter power is controlled by the data processor to assure link quality while minimizing interference to other networks. The amplified carrier is then conducted through the T-R switch 101 to be radiated by the antenna 100.

LINKS FROM BASE STATION TO MOBILE RADIO

As discussed above in connection with FIG. 5, the base station uses three consecutive time slots every other three slots of a frame for transmission. Each slot duration is 5/3 milliseconds which contains 96 symbols at the symbol rate of 57,600 baud. Each base-to-mobile transmission starts with a 32-symbol synchronization preamble which is followed by an 8-symbol unique word. Following the unique word, 232 symbols of user data, which includes addressing, cyclic redundancy check (CRC) coding, and at least two symbols of forward error correction (FEC) flush. A 16-symbol guard interval, during which no data is transmitted, follows the user data. The user-data segment is rate-1/2, convolutionally encoded, and each 64-ary symbol encodes 6 bits. Consequently, 232×6/2=696 bits of addressing, information, CRC, and flush information are encoded in each user segment.

A preferred embodiment of the convolutional encoder uses the industry-standard code generators $G_0=171_8$ and $G_1=133_8$ for constraint length k=7. Further details of convolutional encoding and decoding are found in *Error-Correction Coding for Digital Communications*, George C. Clark and J. Bibb Cain, pp 227–235, Plenum Press, 1981, which is incorporated herein by reference.

Figure 11:
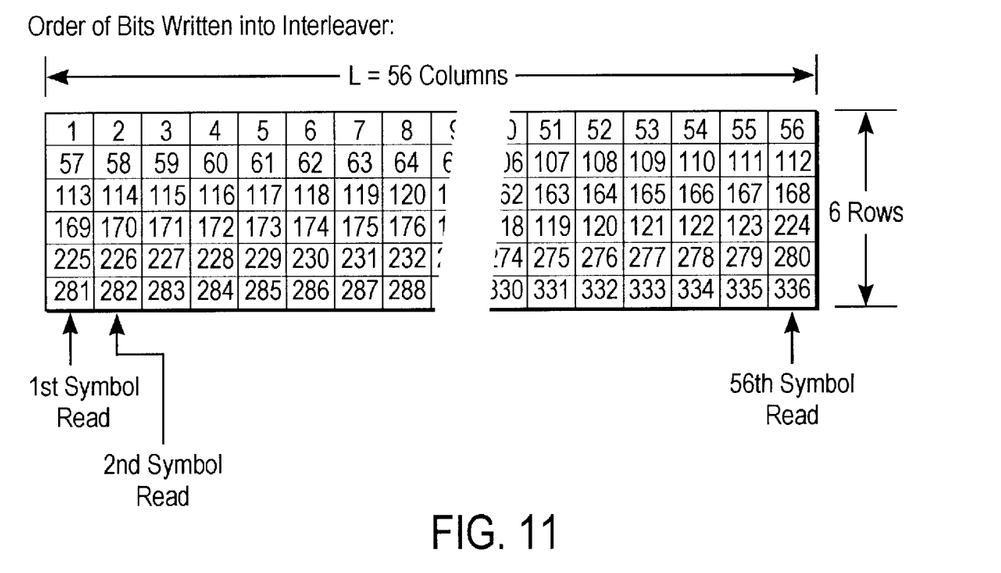
FIG. 11 shows the sequential order that bits are written into the interleaver, and the sequential order that 6-bit symbols are read from the interleaver.

The convolutional encoder generates 1392 bits for each three time slot transmission. The 1392 bits are interleaved by writing six rows of L bits, and then reading L columns of 6-bit symbols. FIG. 11 illustrates the preferred interleaver embodiment. In the exemplary embodiment for L=56 symbols, the first 56 bits output from the convolutional encoder are written into the first row, the second 56 bits are written into the second row, and so forth until the sixth group of 56 bits are written in the sixth row. After all 56×6=336 bits are written into the interleaver, the reading operation begins. The bits are read in groups of 6 bits with each group forming a 6-bit symbol. The first symbol, or group, read is the leftmost column consisting of bits 1, 57, 113, 169, 225, and 281. The second symbol is the next column consisting of bits 2, 58, 114, 170, 226, and 282. The reading operation continues in this fashion until the last column consisting of bits 56, 112, 168, 224, 280, and 336 is read.

The 232 symbols are interleaved in three blocks: the first block has L=56 symbols, followed by L=96 symbols, and then L=80 symbols. In this embodiment, the first 56 symbols are interleaved and output to the Gold encoder 9b before the second block of 96 symbols are interleaved. Similarly, the second block of 96 symbols are interleaved before the final block of 80 symbols is interleaved.

The 6-bit symbols that are read from the interleaver output are used to initialize the g2-sequence generator 50 to the beginning of each 63-chip Gold-code sequence.

The g1-sequence generator 51 is initialized to a non-zero value, such as all-ones, during the unique-word and user-data intervals. The product of the g1 and g2 sequences is used to GMSK modulate the RF carrier for transmission. The preferred BT product is 0.25, thus confining 99.9% of the power of the modulated carrier to be within a bandwidth of less than 5 MHz. The BT product is the product of the Gaussian lowpass filter bandwidth, B, and the spreading-code chip interval, T, as defined earlier.

LINKS FROM MOBILE RADIOS TO BASE STATIONS

In the preferred embodiment, mobile radios share the three consecutive time slots that the base radio is not using. The slot duration and symbol rate of the mobile-to-base transmissions are the same as the base-to-mobile transmissions. The mobile-to-base time slots are either assigned to specific mobile radios for their exclusive use, or assigned to a group of radios for their mutually shared used. Mobile-to-base transmissions are one, two, or three slots long. In all cases, the transmission starts with a 32-symbol synchronization preamble and an 8-symbol unique word. User data, which includes addressing, CRC coding, and at least two symbols of FEC flush, is transmitted following the unique word, and its length depends upon the number of slots being used. For one-slot bursts, 40 symbols of user data are interleaved as one 40×6 bit block. For two-slot bursts, 136 symbols of user data are interleaved as a 56×6 bit block followed by an 80×6 bit block. For three-slot bursts, 232 symbols of user data are interleaved as a 56×6 bit block followed by a 96×6 bit block and then an 80×6 bit block. The user data is convolutionally encoded, interleaved, and modulated similarly to the base-to-mobile links. Following the user data, no data is transmitted for a 16-symbol guard interval.

The network architecture of FIG. 1 using link protocols, as described above, can provide the following communication services:

Simplex or half-duplex data transmission between a mobile radio and the base, another mobile radio via the base-radio relay, or another entity via the external interface at the base station.

Data multi-cast from the base station to any combination of mobile radios. The data source may be another entity that is connected to the external interface at the base station.

Data exchange, whereby any mobile or base radio in the exchange group can transmit to all other radios in the conference. The base radio may be connected to another entity via the external interface at the base station.

Simplex or half-duplex voice transmission between a mobile radio and the base, another mobile radio via the base-radio relay, or the PSTN via the external interface at the base station.

Voice conference, whereby any mobile or base radio in the conference can transmit to all other radios in the conference. The base radio may be connected to the PSTN via the external interface at the base station.

The data processor 108 also digitizes voice and formats Internet communication packets into similar digital data streams so that either can be transmitted and received by the transceiver. This aspect of the present invention is utilized in a voice/Internet dual communication system illustrated in FIG. 12. In particular, the voice/Internet dual system includes a computer 121 configured to receive and send Internet communication packets. In turn, the computer is connected to the mobile radio 2 which can establish a communication link with the base station 1. The mobile radio 2 and the base station 1 are implemented as discussed above. The external interfaces 9, discussed in connection with FIG. 1, can be a phone jack for providing the Internet connection to the base station 1.

Figure 12:
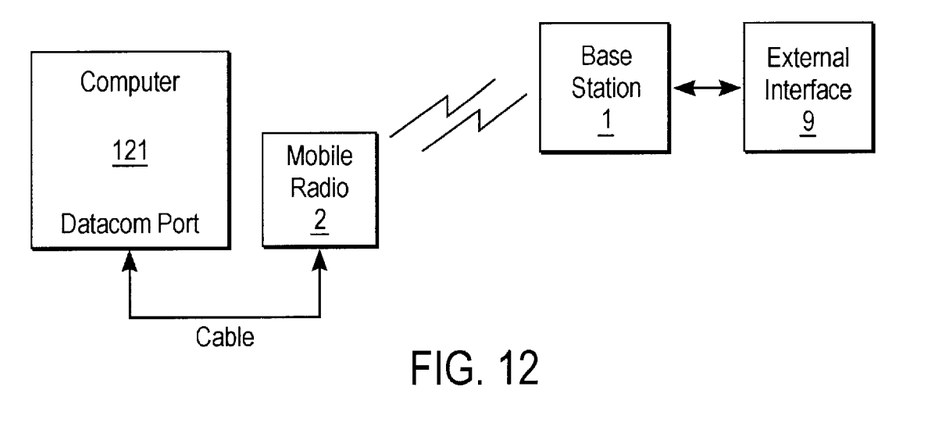
FIG. 12 shows a system in which a computer is connected to a mobile radio of the present invention.

From a user's perspective, the voice/Internet dual system operates similarly to a conventional mobile phone except that it offers the additional capability of handling both voice and binary data, e.g., Internet communication packets.

The present invention is not to be limited in scope by the specific embodiments described herein. Indeed, modifications of the invention in addition to those described herein will become apparent to those skilled in the art from the foregoing description and accompanying figures. Doubtless, numerous other embodiments can be conceived that would not depart from the teaching of the present invention, whose scope is defined by the following claims.

What is claimed is:

1. A radio signal transmitter comprising:
    an encoder configured to generate a plurality of symbols, wherein each symbol includes a plurality of bits;
    a first shift register including a plurality of stages and a first feedback arrangement;
    a second shift register including a plurality of stages and a second feedback arrangement, the second shift register configured to receive in parallel the plurality of bits of the symbols,
    wherein the first and second shift registers are configured to shift a plurality of times for each symbol received by the second shift register; and
    a first exclusive-OR gate configured to receive outputs from the first and second shift registers, thereby generating a codeword sequence for each symbol received by the second shift register.

2. The transmitter according to claim 1 wherein the length of each codeword sequence is M−1, where M is equal to $2^k$ and k is a positive integer.

3. The transmitter according to claim 1 wherein k is equal to one of five, six and seven.

4. The transmitter according to claim 1 further comprising:
    a delay circuit configured to delay output of the first exclusive-OR gate; and
    a second exclusive-OR gate configured to receive outputs from the delay circuit and the first exclusive-OR gate.

5. The transmitter according to claim 4 further comprising:
    a filter configured to received output from the second exclusive-OR gate, wherein frequency response of the filter is substantially identical to a Gaussian distribution.

6. The transmitter according to claim 5 further comprising:
    a modulator configured to receive output from the filter and to apply minimum shift keyed modulation to the output of the filter.

7. The transmitter according to claim 1 wherein the first feedback arrangement comprises:
    a second exclusive-OR gate configured to receive outputs from a first stage and a second stage of the first shift register.

8. The transmitter according to claim 1 wherein the second feedback arrangement comprises:
    a second exclusive-OR gate configured to receive outputs from a first stage and a second stage of the second shift register;
    a third exclusive-OR gate configured to receive outputs from a third stage of the second shift register and from the second exclusive-OR gate; and
    a fourth exclusive-OR gate configured to receive outputs from a sixth stage of the second shift register and from the third exclusive-OR gate.

9. The transmitter according to claim 1 wherein the first feedback arrangement comprises:
    a second exclusive-OR gate configured to receive outputs from a first stage and a second stage of the first shift register;
    a third exclusive-OR gate configured to receive outputs from a third stage of the first shift register and from the second exclusive-OR gate; and
    a fourth exclusive-OR gate configured to receive outputs from a sixth stage of the first shift register and from the third exclusive-OR gate.

10. The transmitter according to claim 1 wherein the second feedback arrangement comprises:
- a second exclusive-OR gate configured to receive outputs from a first stage and a third stage of the second shift register;
- a third exclusive-OR gate configured to receive outputs from a fourth stage of the second shift register and from the second exclusive-OR gate; and
- a fourth exclusive-OR gate configured to receive outputs from a sixth stage of the second shift register and from the third exclusive-OR gate.

11. The transmitter according to claim 1 wherein the first feedback arrangement comprises:
- a second exclusive-OR gate configured to receive outputs from a first stage and a third stage of the first shift register;
- a third exclusive-OR gate configured to receive outputs from a fourth stage of the first shift register and from the second exclusive-OR gate; and
- a fourth exclusive-OR gate configured to receive outputs from a sixth stage of the first shift register and from the third exclusive-OR gate.

12. The transmitter according to claim 1 wherein the second feedback arrangement comprises:
- a second exclusive-OR gate configured to receive outputs from a first stage and a sixth stage of the second shift register.

13. The transmitter according to claim 1 wherein the first feedback arrangement comprises:
- a second exclusive-OR gate configured to receive outputs from a first stage and a sixth stage of the first shift register.

14. The transmitter according to claim 1 wherein the second feedback arrangement comprises:
- a second exclusive-OR gate configured to receive outputs from a first stage and a second stage of the second shift register;
- a third exclusive-OR gate configured to receive outputs from a fifth stage of the second shift register and from the second exclusive-OR gate; and
- a fourth exclusive-OR gate configured to receive outputs from a sixth stage of the second shift register and from the third exclusive-OR gate.

15. The transmitter according to claim 1 wherein the first feedback arrangement comprises:
- a second exclusive-OR gate configured to receive outputs from a first stage and a second stage of the first shift register;
- a third exclusive-OR gate configured to receive outputs from a fifth stage of the first shift register and from the second exclusive-OR gate; and
- a fourth exclusive-OR gate configured to receive outputs from a sixth stage of the first shift register and from the third exclusive-OR gate.

16. The transmitter according to claim 1 wherein the second feedback arrangement comprises:
- a second exclusive-OR gate configured to receive outputs from a first stage and a second stage of the second shift register;
- a third exclusive-OR gate configured to receive outputs from a fourth stage of the second shift register and from the second exclusive-OR gate; and
- a fourth exclusive-OR gate configured to receive outputs from a fifth stage of the second shift register and from the third exclusive-OR gate.

17. The transmitter according to claim 1 wherein the first feedback arrangement comprises:
- a second exclusive-OR gate configured to receive outputs from a first stage and a second stage of the first shift register;
- a third exclusive-OR gate configured to receive outputs from a fourth stage of the first shift register and from the second exclusive-OR gate; and
- a fourth exclusive-OR gate configured to receive outputs from a fifth stage of the first shift register and from the third exclusive-OR gate.

18. The transmitter according to claim 1 wherein the second feedback arrangement comprises:
- a second exclusive-OR gate configured to receive outputs from a first stage and a second stage of the second shift register.

19. The transmitter according to claim 1 further comprising:
- a data processor configured to output a digital data message, wherein the digital data message is one of digitized voice data and an Internet communication packet or other digital information.

20. The transmitter according to claim 19 further including:
- a memory block having an adjustable number of columns and a predetermined number of rows, configured to sequentially store output from the encoder row by row and configured to output the stored data column by column.

21. The transmitter according to claim 20 wherein the number of columns is equal to one of fifty-six, eighty and ninety-six.

22. A radio signal receiver comprising:
- a first shift register including a plurality of stages and configured to receive an input signal;
- a second shift register including a plurality of stages, configured to receive a first locally generated codeword sequence that contains a plurality of symbols and configured to circularly shift the first codeword sequence;
- a first accumulator configured to multiply and accumulate an all zero symbol with the input signal;
- a second accumulator coupled to the first and second shift registers and configured to multiply and accumulate stored values therein each time the second shift register is circularly shifted; and
- a first device coupled to the first and second accumulators and configured to identify one symbol from the plurality of symbols based on outputs from the first and second accumulators.

23. The receiver according to claim 22 wherein each first and second shift register includes an identical number of stages equal to an integer multiple of $(2^k-1)$ wherein k is a positive integer equal to the number of bits in each symbol.

24. The receiver according to claim 23 wherein the integer multiple is equal to two.

25. The receiver according to claim 24 wherein k is equal to one of five, six and seven.

26. The receiver according to claim 22 wherein the first device further comprising:
- a selector configured to identify the one symbol from the plurality of symbols as the symbol that causes the largest value to be generated among the output values the first and second accumulators.

27. The receiver according to claim 22 wherein the first device further comprising:

a first computing means configured to calculate a first envelope value approximating to a square-root of a squared in-phase added to a squared quadrature-phase components of the first accumulator; and a second computing means configured to calculate a second envelope value a plurality of second envelope values approximating to square-roots of a squared in-phase added to a squared quadrature-phase components of the second accumulator, wherein the input signal includes an in-phase and quadrature-phase components and the first and second accumulators are further configured to generate outputs in corresponding in-phase and quadrature-phase components, and wherein the first and second envelope values are calculated each time the shift register is circularly shifted.

28. The receiver according to claim 27 wherein each symbol includes a plurality of bits, and further comprising:

a plurality of first peak detectors provided for each bit of the symbols, each first peak detector configured to identify a largest envelope value when the corresponding one bit of the symbol is in a first state; and a plurality of second peak detectors provided for each bit of the symbols, each second peak detector configured to identify a largest envelope value when the corresponding one bit of the symbol is in a second state.

29. The receiver according to claim 28 wherein the first device further comprises:

a plurality of comparator provided for each bit of the symbols and coupled to the corresponding one of the first and one of the second peak detectors, each comparator configured to calculate a difference between outputs of the first and second peak defectors coupled thereto, wherein the first device further configured to identify the symbol based on outputs of the comparators.

30. The receiver according to claim 22 further comprising:

an antenna configured to receive a transmitted radio signal;

a down-converter configured to translate the received radio signal to a baseband signal; and a correlator configured to multiply a second locally generated codeword sequence to a signal generated based on the baseband radio signal, to thereby generate the input signal.

31. A communication device comprising:

a transmitter that includes:

an M-ary encoder configured to convert an input data stream into a stream of symbols each comprising k bits, wherein each k-bit symbol is a member of a set of M distinct k-bit symbols where M is equal to $2^k$ and k is a positive integer greater than one; and a code generator configured to produce a spread spectrum codeword sequence based on the symbols generated by the M-ary encoder and based on first and second Gold code polynomials, the spread spectrum codeword sequence including a distinct respective M−1 bit codeword for each distinct respective k-bit symbol, wherein the transmitter is configured to send a radio signal based on the spread spectrum codeword sequence.

32. The device according to claim 31 further comprising:

a receiver configured to receive a spread spectrum radio signal that includes a sequence of the M−1 bit codewords corresponding to a sequence of the k-bit symbols, the receiving including:

a first shift register configured to receive an input signal generated based on the received radio signal;

a second shift register configured to receive a first locally generated codeword sequence that encodes the k-bit symbols and configured to circularly shift the first locally generated codeword sequence;

an accumulator coupled to the first and second shift registers and configured to multiply and accumulate stored values in the first and second shift registers each time the second shift register is circularly shifted; and a selecting device coupled to the accumulator and configured to identify one symbol from the M distinct k-bit symbols based on outputs from the accumulator.

33. The device according to claim 31 wherein the transmitter further comprises:

a data processor configured to digitize voice signal and to format Internet communication packets to be sent to the transmitter.

34. The transceiver according to claim 31 wherein the transmitter further comprises:

a digital encoder configured to code output from the data processor using a forward error correction (FEC) scheme.

35. The device according to claim 31 wherein the transmitter further comprises:

an interleaver memory having a plurality of columns and rows of memory locations, configured to store output of the digital encoder row by row and configured to retrieve the stored input data column by column, wherein the number of rows is equal to k.

36. The device according to claim 31 wherein the transmitter further comprises:

a modulator configured to modulate a carrier signal based on the spread spectrum codeword sequence modulated using a Gaussian-filtered, minimum shift keying scheme.

37. The device according to claim 31 further comprising:

a data processor configured to digitize voice signal and to format Internet communication packets to be sent to the transmitter.

38. A method of communication comprising:

converting an input data stream into a stream of symbols each comprising k bits, wherein each k-bit symbol is a member of a set of M distinct k-bit symbols where M is equal to $2^k$ and k is a positive integer greater than one; and generating a spread spectrum codeword sequence based on the stream of symbols and based on first and second Gold code polynomials, the spread spectrum codeword sequence including a distinct respective M−1 bit codeword for each distinct respective k-bit symbol in the stream of symbols; and transmitting a radio signal based on the spread spectrum codeword sequence.

39. The method according to claim 38 further comprising:

receiving a spread spectrum radio signal that includes a sequence of the M−1 bit codewords corresponding to a sequence of the k-bit symbols, the receiving including:

storing an input signal generated based on the received radio signal to a first shift register;

storing a first locally generated codeword sequence that encodes the plurality of symbols to a second shift register;

circularly shifting the first locally generated codeword sequence in the second shift register;

multiplying and accumulating stored values in the first and second shift registers each time the second shift register is circularly shifted; and selecting one symbol from the plurality of symbols based on the multiplied and accumulated stored values.

40. The method according to claim 38 further comprising:

selecting to transmit voice signal or Internet communication packets;

digitizing the voice signal when the voice signal is to be transmitted; and formatting the Internet communication packets when the packets are to be transmitted.

41. The method according to claim 40 further comprising:

processing the digitized or formatted data using a convolution encoding scheme.

42. The method according to claim 40 further comprising:

processing the digitized or formatted data using a forward error correction (FEC) scheme.

43. The method according to claim 42 further comprising:

storing the FEC processed data into a table-like memory locations row by row;

reading the stored data in the table-like memory locations column by column.

44. The method according to claim 38 wherein the transmitter further comprises:

modulating a carrier signal based on the spread spectrum codeword sequence modulated using a Gaussian-filtered, minimum shift keying scheme.

45. The method according to claim 38 further comprising:

generating a synchronization preamble and user data when generating the plurality of symbols.

46. The method according to claim 39 further comprising:

generating a synchronization preamble and user data when generating the plurality of symbols; and aligning the input signal with the first locally generated codeword sequence by utilizing the synchronization preamble.

47. The method according to claim 38, the converting including storing data corresponding to the input data row by row in a data structure having a plurality of columns and k rows, and retrieving the stored data column by column from the data structure so as to generate the k-bit symbols.

* * * * *